United States Patent [19]
Kage et al.

[11] Patent Number: 5,933,404
[45] Date of Patent: Aug. 3, 1999

[54] DISC CHANGER

[75] Inventors: Shingo Kage, Kobe; Makoto Kambayashi, Neyagawa; Yasunari Toyama, Osaka, all of Japan

[73] Assignee: Matsushita Electric Industrial Co., Ltd., Osaka, Japan

[21] Appl. No.: 08/917,887

[22] Filed: Aug. 27, 1997

[30] Foreign Application Priority Data

Aug. 28, 1996 [JP] Japan .................................... 8-226527

[51] Int. Cl.⁶ .................................................. G11B 17/04
[52] U.S. Cl. ............................................................ 369/192
[58] Field of Search .................................. 369/75.1–75.2, 369/77.2–77.1, 191–192, 178, 36, 34

[56] References Cited

U.S. PATENT DOCUMENTS 5,703,866 12/1997 Hayashi et al. .......................... 369/192

Primary Examiner—Allen T. Cao
Attorney, Agent, or Firm—Wenderoth, Lind & Ponack, L.L.P.

[57] ABSTRACT

Provided is a disc changer capable of being made compact with a relatively simple construction and infallibly avoiding the interference of a disc transfer member with the other drive components within a limited space. The disc changer 1 is provided with a disc lodging magazine 50, a disc recording and reproducing unit 10 and a disc transfer unit 30 which transfers a disc 55 between the magazine and the recording and reproducing unit. The disc transfer unit is provided with a transfer member 31 which is engaged with a disc retaining tray 56, extends in a disc transfer direction and is elastically deformable in a direction perpendicular to the disc transfer direction, driving mechanism 34, 35 for driving the transfer member, and a guide section 37 which guides the slide operation of the transfer member. The transfer member is elastically deformed by a specified quantity at its middle portion in the above perpendicular direction so that its portion corresponding to the magazine is located outside the magazine.

6 Claims, 6 Drawing Sheets

DISC CHANGER

BACKGROUND OF THE INVENTION

The present invention relates to a disc changer to be used for a disc which serves as a data recording medium such as a CD (Compact Disc).

Conventionally, as a disc changer to be used for a disc which serves as a data recording medium such as a CD, there has been a generally known one, as exemplified in FIG. 7, in which a recording and reproducing unit 110 for recording information on a disc 155 and reproducing the information recorded on the disc 155 is provided in its main body 102, a magazine 150 for lodging therein discs 155 is mounted adjacently beside the recording and reproducing unit 110 and a disc transfer unit 130 for transferring the disc 155 is provided between the magazine 150 and the recording and reproducing unit 110.

The disc transfer unit 130 is provided with an engagement arm 132 which is engaged with a tray 156 for retaining the disc 155 and a transfer member 131 which extends in a disc transfer direction (the lateral direction in FIG. 7). This transfer member 131 is normally provided with a rack (not shown) extending in the direction in which the transfer member extends (i.e., in the disc transfer direction). As described later, by driving the transfer member 131 by an electric motor (not shown) or the like via a gear mechanism (not shown) provided with a gear to be meshed with this rack, the tray 156 that is retaining the disc 155 is transferred between the magazine 150 and the recording and reproducing unit 110. The imaginary lines indicated by the one-dot chain lines in FIG. 7 show a state in which the disc 155 and )the tray 156 (see the illustration indicated by the solid lines) lodged in the magazine 150 are drawn out rightward and transferred to be mounted on the recording and reproducing unit 110.

For the purpose of making the transfer member 131 slide smoothly, a pair of guide sections 137 for slidably guiding the transfer member 131 in the disc transfer direction are provided. These guide sections 137 and 137 are arranged so that one of them is generally placed in a position where it protrudes on the magazine 150 side for the purpose of more stably guiding the slide operation of the transfer member 131. Conventionally, these guide sections 137 and 137 have been provided as fixed to the disc changer body 102.

On the other hand, the recording and reproducing unit 110 is provided with a turntable 112 on which the disc 155 is placed and rotated and a pickup section 111 for writing information on the disc 155 or reading the information recorded on the disc 155 rotated on this turntable 112. The pickup section 111 and the turntable 112 are supported on a base block and normally driven integrally with the base block for the purpose of holding the disc 155 placed on the turntable 112 between the turntable and the base plate of the recording and reproducing unit 110 in a clamped state.

Conventionally, the transfer member 131 has been formed as a rigid body of, for example, a steel plate having a specified thickness (e.g., about 1 mm), and for the purpose of avoiding the possible occurrence of an interference of the transfer member 131 with the magazine 150, the guide sections 137 are provided outside the outermost portion of an outer wall of the magazine body 151 by a specified dimension.

Therefore, it is required to secure in a direction perpendicular to the disc transfer direction a space for the slide operation of the transfer member 131, i.e., a space (see the dimension Y2 in FIG. 7) between the outermost portion of the outer wall of the magazine body 151 and a side wall 105 of the disc changer body 102 of at least to a certain size. Particularly in a disc changer for onboard use in a vehicle where the mounting space is limited, the above arrangement is disadvantageous in attempting to reduce the size of the disc changer.

Furthermore, the guide sections 137 have been conventionally provided as fixed to the disc changer body 102, and therefore, it has been not so easy to achieve a layout such that the interference of the guide sections 137 and the transfer member 131 with the other drive components such as the turntable 112 and the pickup section 111 driven inside the disc changer body 102 can be infallibly avoided within the limited space.

SUMMARY OF THE INVENTION

The present invention has been developed in view of the aforementioned technical problems and has an object to provide a disc changer capable of being compact with a relatively simple construction and infallibly avoiding the interference of the disc transfer member with the other drive components within the limited space.

Therefore, according to a first aspect of the present invention, there is provided a disc changer having a disc lodging means for lodging therein a disc, a recording and reproducing means for recording information on a disc or reproducing the information recorded on the disc, and a disc transfer means for transferring the disc between the disc lodging means and the recording and reproducing means, the disc transfer means comprising: an engagement portion to be engaged with the disc itself or a disc retaining member; a transfer member which extends in a disc transfer direction and is elastically deformable in a direction perpendicular to the transfer direction; a driving means for driving the transfer member in the disc transfer direction; and a guide section capable of slidably guiding the transfer member in the disc transfer direction. The transfer member has a construction in which it is elastically deformed by a specified quantity at its middle portion in the direction perpendicular to the disc transfer direction so that its portion corresponding to the disc lodging means is located outside the disc lodging means.

According to a second aspect of the present invention, based on the first aspect of the present invention, a guide passage of the guide section is located inside an outermost portion of an outer wall of the disc lodging means, and the transfer member is elastically deformed at its middle portion in the direction perpendicular to the disc transfer direction by the outermost portion of the disc lodging means when the transfer member slides into a position corresponding to the disc lodging means.

Further, according to a third aspect of the present invention, based on the first aspect, a guide passage of the guide section has a straight portion which extends in the disc transfer direction inside an outermost portion of an outer wall of the disc lodging means and a meander portion which meanders outwardly from the straight portion, and the transfer member is deformed at its middle portion in the direction perpendicular to a direction in which it slides by the meander portion when the transfer member slides into a position corresponding to the disc lodging means.

Further, according to a fourth aspect of the present invention, based on any one of the first through third aspects of the present invention, the recording and reproducing means has a turntable on which the disc is placed and rotated, a pickup section for writing information on the disc or reading the information recorded on the disc rotated on the turntable, and is provided with a first base member for retaining the pickup section and the turntable and a second base member provided with a clamp member which presses the disc supported on the turntable against the turntable so as to hold the disc. One of the first and second base members is swingably engaged with the other of the first and second base member so that the disc and the clamp member can are abuttable against each other and separable apart from each other. The guide section of the disc transfer means is provided on the one base member, and the transfer member is lodged along the one base member when the disc is loaded on the turntable.

DETAILED DESCRIPTION OF THE PREFERRED EMBODIMENT

A preferred embodiment of the present invention will be described in detail below with reference to the accompanying drawings.

Figure 1:
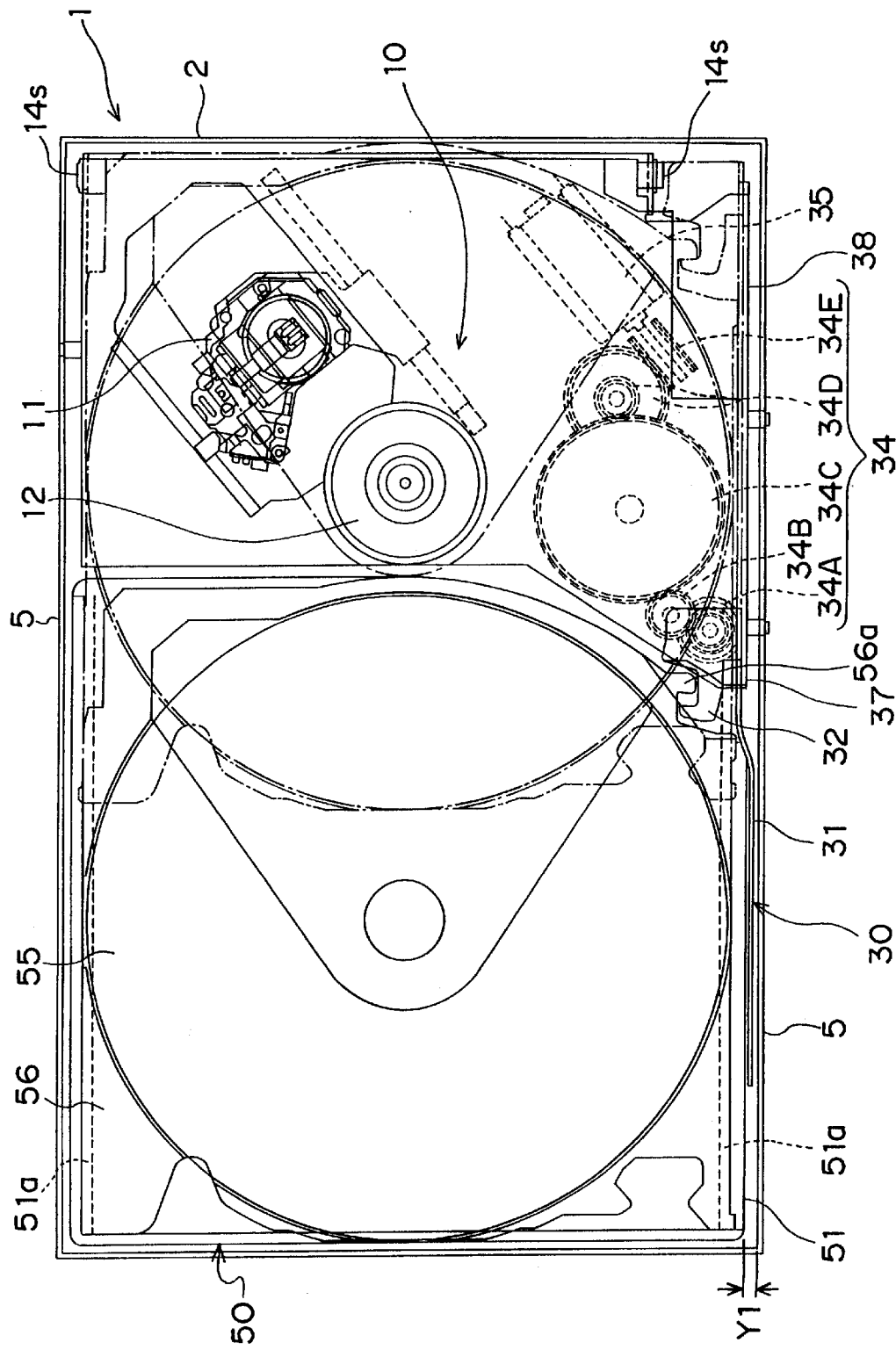
FIG. 1 is an explanatory plan view showing the schematic construction of a disc changer according to an embodiment of the present invention.
Figure 2:
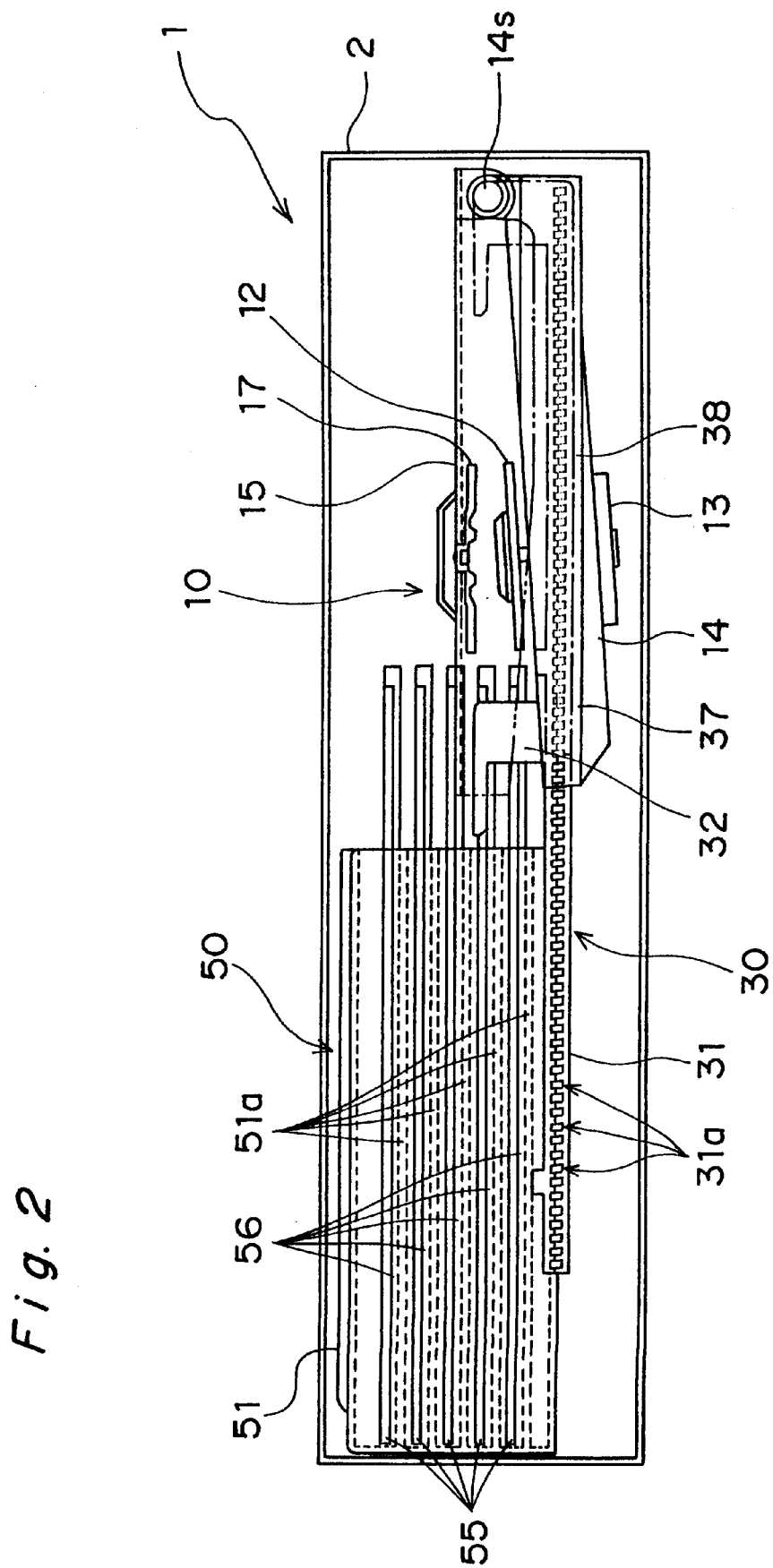
FIG. 2 is an explanatory side view of the disc changer.

FIGS. 1 and 2 provide an explanatory plan view and an explanatory side view schematically showing the construction of a disc changer 1 according to the present embodiment. As shown in these figures, the disc changer 1 is provided with a recording and reproducing unit 10 which records information on a disc 55 or reproduces the information recorded on the disc 55 which serves as a data recording medium such as a CD (Compact Disc). The recording and reproducing unit 10 is located in one side region inside a main body 2 constituting an approximately rectangular parallelepiped casing.

Then, a side region adjacent to this recording and reproducing unit 10 has mounted there in, for example, a dismountable magazine 50 which serves as a disc lodging means for lodging therein discs 55.

This magazine 50 is provided with a main body 51 whose outer configuration is formed totally into an approximately rectangular parallelepiped shape, and preferably a plurality of parallel frame sections 51a (see FIG. 2) are provided inside the magazine body 51.

Then, by supporting each tray 56 by the frame sections 51a with each disc 55 retained on the tray 56 which serves as a disc retaining member, a plurality of discs 55 can be lodged in a state in which they are stacked at specified intervals.

On the other hand, the recording and reproducing unit 10 is provided with a turntable 12 for rotating the disc 55 placed on it, a drive motor 13 (see FIG. 2) for rotatively driving the turntable 12 and a pickup section 11 for writing information on the disc 55 or reading the information recorded on the disc 55 that is rotated by the turntable 12. The pickup section 11, the turntable 12 and the drive motor 13 are each supported on a base block 14.

Furthermore, the recording and reproducing unit has an upper plate 15 which constitutes its ceiling section, and a damper 17 which clamps the disc 55 placed on the turntable 12 by pressing the disc against the turntable 12 is rotatably mounted to the upper plate 15. The base block 14 is swingably supported on the upper plate via a pair of pivot axes 14s.

Between the magazine 50 and the recording and reproducing unit 10 is provided a disc transfer unit 30 for transferring the disc 55 between them. The disc transfer unit 30 has at its one end an engagement arm 32 which is to be engaged with an engagement portion 56a provided at an end portion of the tray 56 and is provided with a transfer member 31 which extends in the disc transfer direction (the lateral direction in FIGS. 1 and 2). This transfer member 31 is provided with a rack 31a extending along the direction in which the transfer member extends (i.e., the disc transfer direction).

Furthermore, the disc transfer unit 30 is provided with a gear mechanism 34 (34A through 34E) having a gear 34A to be meshed with the rack 31a and a drive motor 35 for driving the transfer member 31 via the gear mechanism 34 in the disc transfer direction.

In the present embodiment, the transfer member 31 is formed of, for example, a relatively soft synthetic resin material. Because of its shape, the member is hardly deformed in the disc transfer direction but is able to be elastically deformed relatively easily in the direction perpendicular to the disc transfer direction.

It is to be noted that the transfer member 31 can be made of a material such as a relatively hard rubber or a thin (e.g., about 0.1 to 0.2 mm thick) steel plate as one capable of producing a similar effect.

Furthermore, in the present embodiment, a guide section 37 for guiding the slide operation of the transfer member 31 in the disc transfer direction is provided on the base block 14 of the recording and reproducing unit 10 as described in detail later.

Figure 3:
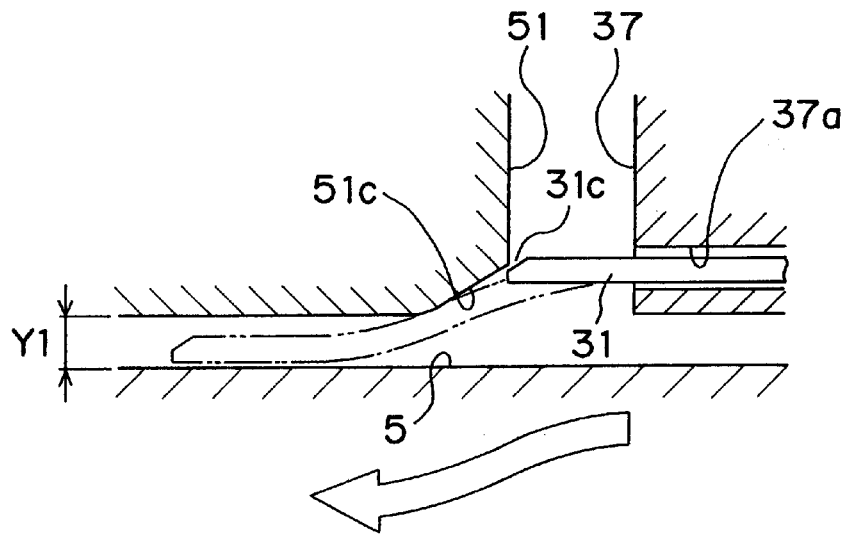
FIG. 3 is an explanatory enlarged plan view showing an essential part of a guide section of the above embodiment.

Then, as shown in FIG. 3, this guide section 37 is set so that at least its guide passage 37a is placed inside the outermost portion of the outer wall of the magazine body 51.

In the above-mentioned construction, when transferring the disc 55 and the tray 56 lodged in the magazine 50 (see the solid lines in FIGS. 1 and 2) to the recording and reproducing unit 10 side, the gear mechanism 34 (34A through 34E) is rotatively driven by rotating the drive motor 35 in a specified direction. By this operation, the rack 31a meshed with the gear 34A is fed rightward in the figure (i.e., to the recording and reproducing unit 10 side), and the transfer member 31 provided with the engagement arm 32 located at the right-hand end is moved rightward.

The tray 56, which is engaged with the engagement arm 32 by the engagement portion 56a, is pulled rightward in accordance with the movement of the transfer member 31 until, for example, the engagement arm 32 abuts against the wall surface of the disc changer 1. Then, in the state in which the transfer is stopped, the disc 55 is loaded on the turntable 12 (see the one-dot chain lines in FIGS. 1 and 2).

Conversely, when lodging the disc 55 loaded on the turntable 12 back into the magazine 50, the disc 55 and the tray 56 can be transferred leftward in the figure (i.e., to the magazine 50 side) by rotating the drive motor 35 in the reverse direction.

In the present embodiment, as stated before, the transfer member 31 is hardly deformed in the disc transfer direction, however, it can be elastically deformed in the direction perpendicular to the disc transfer direction. Then, it is elastically deformed by a specified quantity at its middle portion in the direction perpendicular to the disc transfer direction so that the portion corresponding to the magazine 50 is located outside the magazine body 51.

That is, in the present embodiment, as described above, the guide section 37 is set so that at least its guide passage 37a is located inside the outermost portion of the outer wall of the magazine body 51 (see FIG. 3), and more preferably, tapered portions 51c and 31c are formed at a corner portion on the guide member side in the outermost portion of the outer wall of the magazine body 51 and the tip end portion of the transfer member 31, respectively.

When the transfer member 31 is fed to the magazine 50 side (see the arrow in FIG. 3), the transfer member 31 is directed obliquely outwardly along the tapered portion 51c on the magazine body 51 side and thereafter transferred to the magazine 50 side along a side plate 5 of the disc changer body 2.

Thus, the transfer member 31 is elastically deformed by the specified quantity at its middle portion in the direction perpendicular to the disc transfer direction so that its portion corresponding to the magazine 50 is located outside the magazine body 51.

As described above, according to the present embodiment, the transfer member 31 is constructed as elastically deformable in the direction perpendicular to the disc transfer direction, and it is elastically deformed by a specified quantity at its middle portion in the direction perpendicular to the disc transfer direction so that the portion corresponding to the magazine 50 is located outside the magazine 50. Therefore, even when the guide section 37 is provided inside the outermost portion of the outer wall of the magazine body 51, the transfer member 31 does not interfere with the magazine body 51. As a result, the space for the sliding operation of the transfer member 31, i.e., the space between the outermost portion of the outer wall of the magazine body 51 and the side plate 5 of the disc changer body 2 (see the dimension Y1 in FIGS. 1 and 3) can be set small in the direction perpendicular to the disc transfer direction. That is, the disc changer 1 can be made compact with a relatively simple construction.

Furthermore, the guide section 37 can be placed within the traces of movement of the disc 55 and the tray 56, thereby allowing the space outside the guide section 37 to be effectively utilized.

Furthermore, in particular, at least the guide passage 37a of the guide section 37 is located inside the outermost portion of the outer wall of the magazine 50, and the transfer member 31 is elastically deformed by a specified quantity at its middle portion in the direction perpendicular to the disc transfer direction by the outermost portion of the outer wall of the magazine 50 when it slides into the position corresponding to the magazine 50. Therefore, the transfer member 31 can be elastically deformed by the outer wall of the magazine 50 so that the transfer member 31 does not interfere with the magazine 50.

Figure 4:
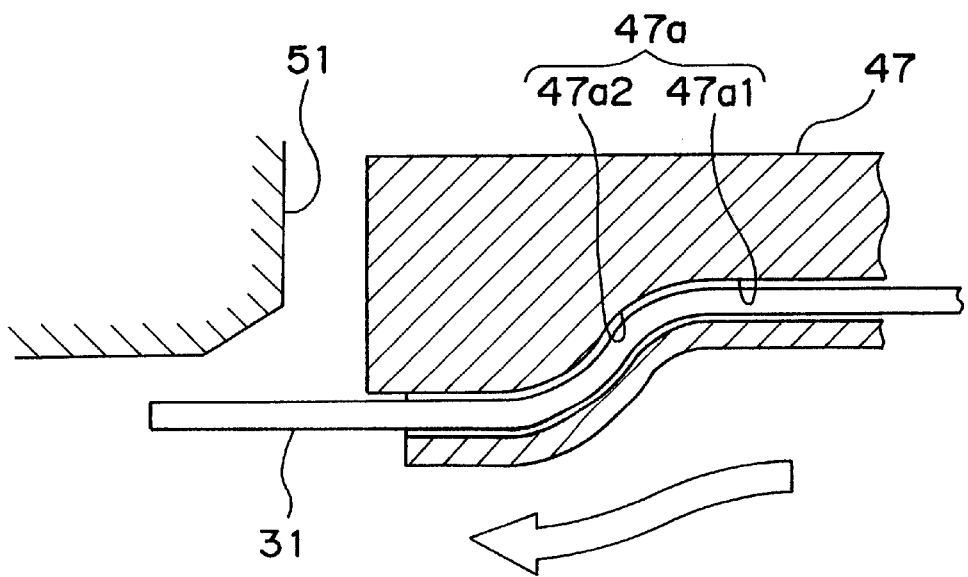
FIG. 4 is an explanatory enlarged plan view showing an essential part of a modified example of the guide section.

FIG. 4 is an explanatory enlarged plan view showing the essential part of a modified example of the guide section. In a guide section 47 according to this modified example, its guide passage 47a has a straight portion 47a1 which extends in the disc transfer direction inside the outermost portion of the outer wall of the magazine body 51 and a meander portion 47a2 which meanders outwardly from the straight portion 47a1. The transfer member 31 is elastically deformed at its middle portion by the meander portion 47a2 in the direction perpendicular to the sliding direction when it slides into the position corresponding to the magazine 50, so that interference with the magazine body 51 is avoided.

According to this modified example, by appropriately setting the meander configuration of the meander portion 47a2 even when the guide passage 47a (particularly its straight portion 47a1) of the guide section 47 is located inside the outermost portion of the outer wall of the magazine body 51, the transfer member 31 can be arbitrarily deformed elastically so that the transfer member 31 is directed in the direction in which it does not interfere with the magazine body 51.

In the present embodiment, as stated before, the guide section 37 for guiding the slide operation of the transfer member 31 in the disc transfer direction is provided on the base block 14 of the recording and reproducing unit 10.

Figure 5:
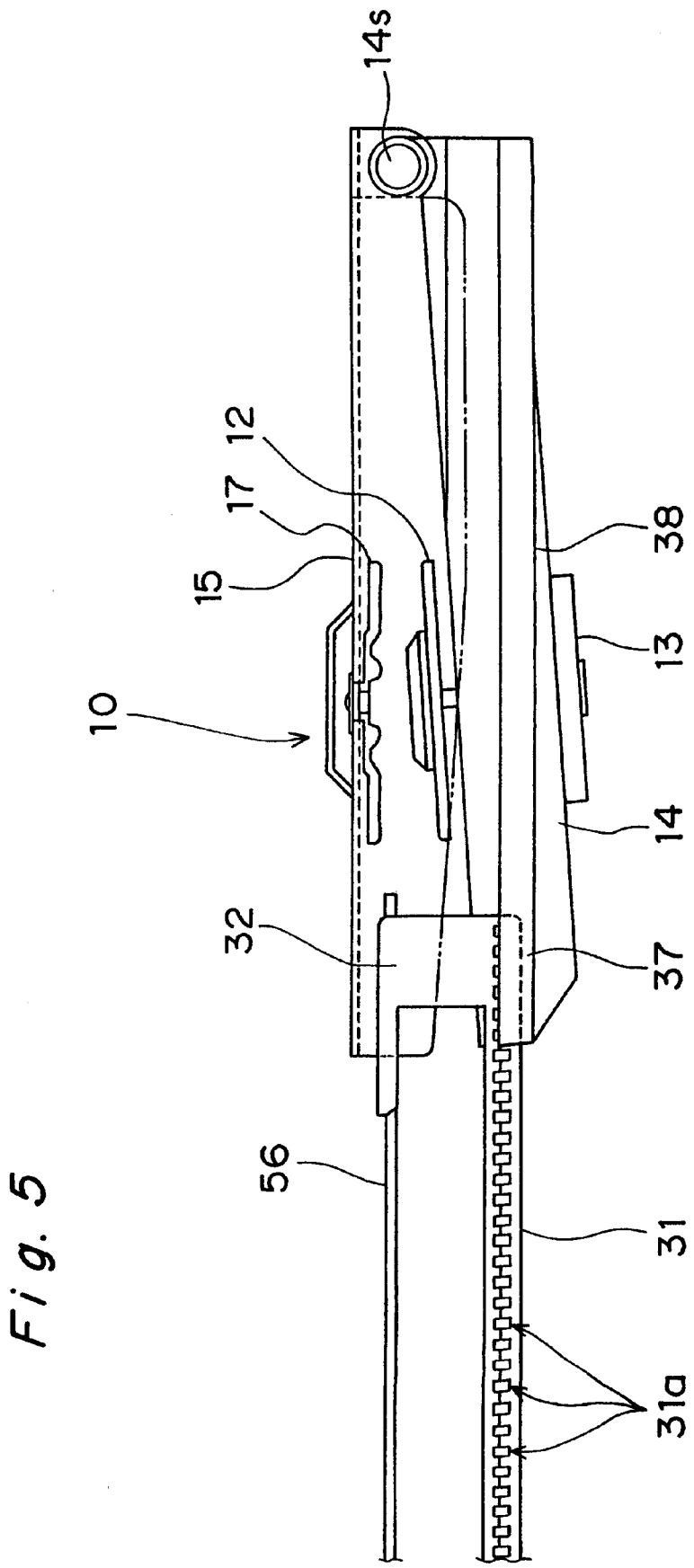
FIG. 5 is an explanatory side view showing a transfer member and a recording and reproducing unit in a disc transfer standby state.
Figure 6:
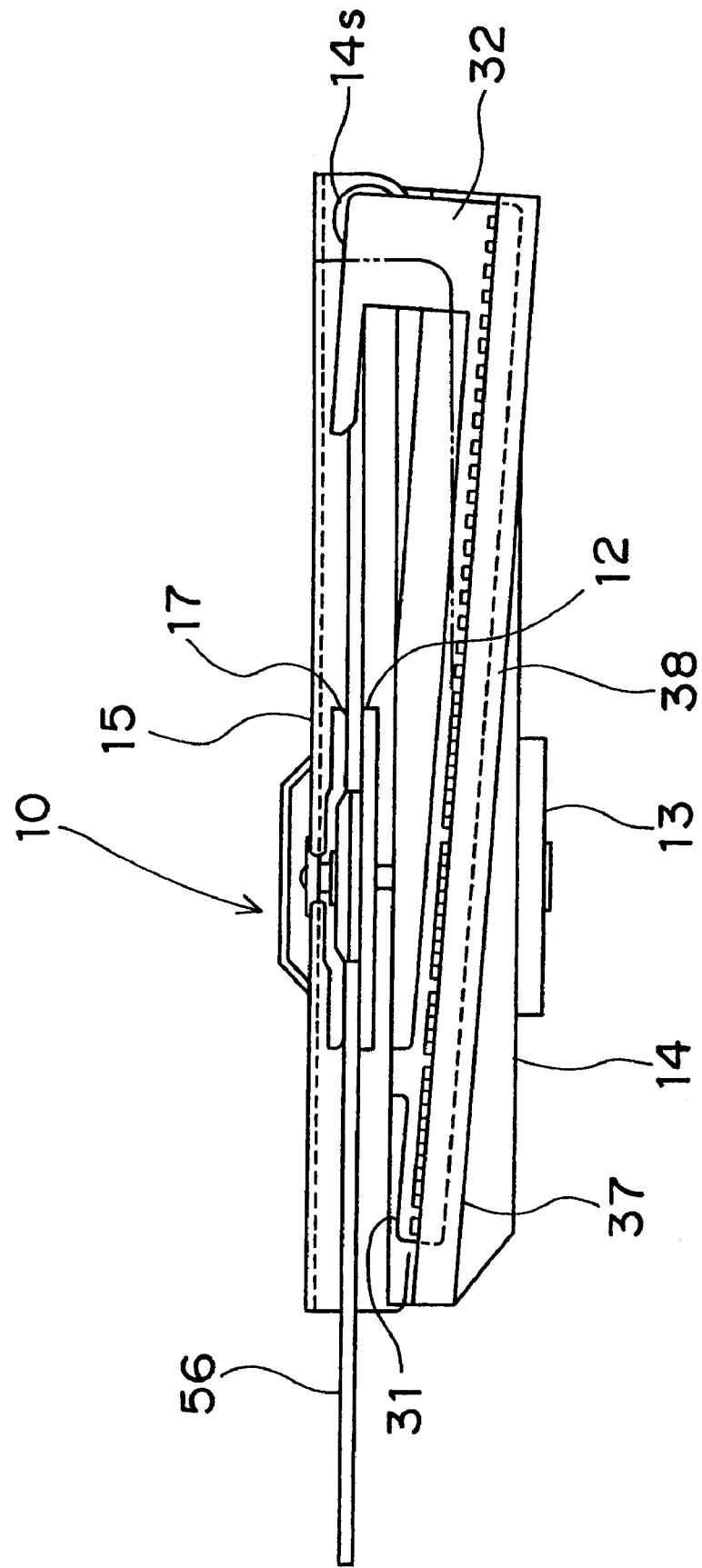
FIG. 6 is an explanatory side view showing the transfer member and the recording and reproducing unit in a disc loading state.
Figure 7:
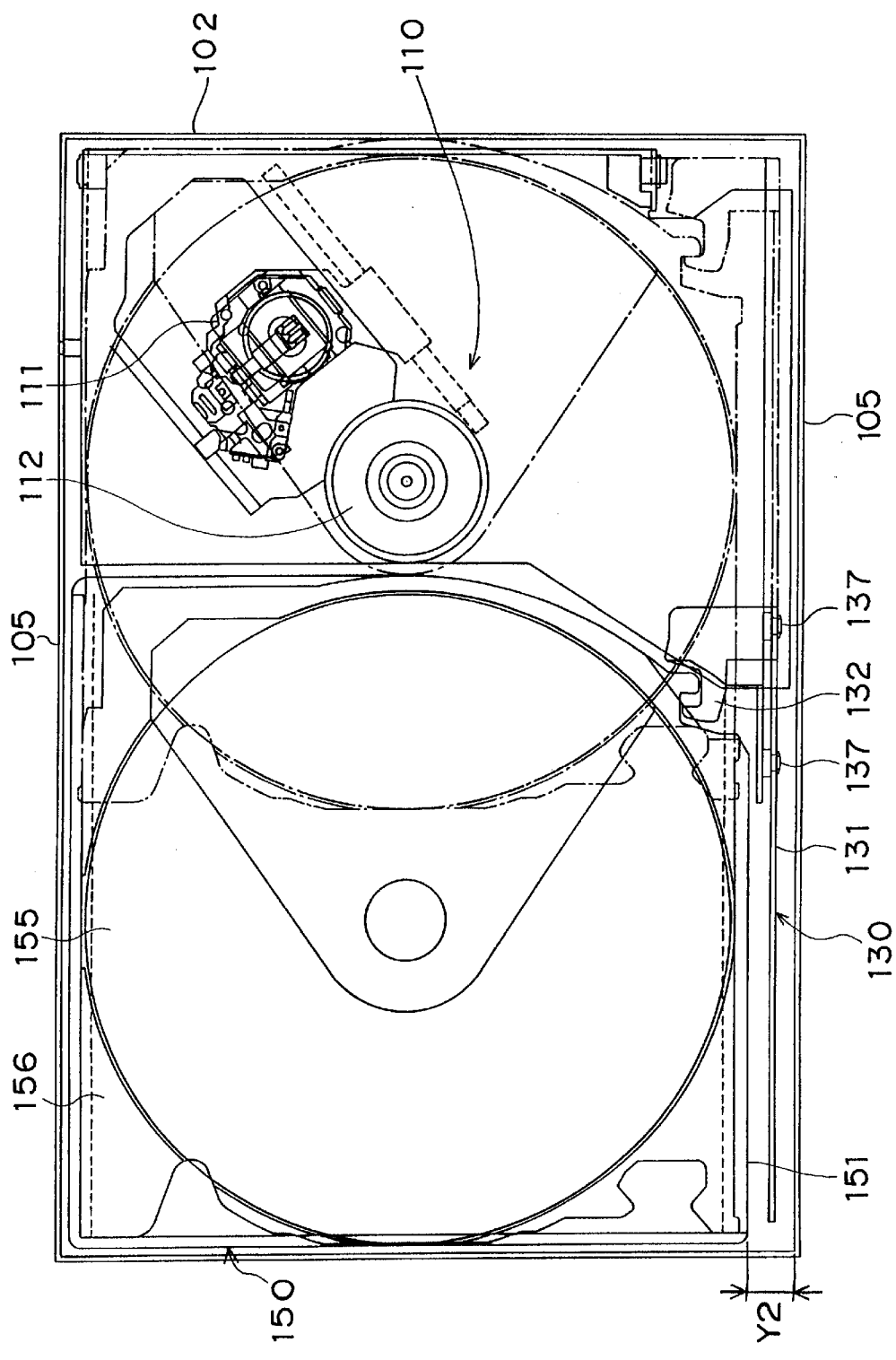
FIG. 7 is an explanatory plan view showing the schematic construction of a prior art disc changer.

That is, as shown in FIGS. 5 and 6, a transfer member lodging section 38 comprised of a groove having specified depth and width dimensions is provided on the side surface of the base block 14. The guide section 37 is preferably formed as a section having a specified length on the entrance side of the transfer member lodging section 38. The remaining portion of the transfer member lodging section 38 has its groove dimension set so that a gap between it and the transfer member 31 is slightly greater than that of the guide section 37, allowing the transfer member 31 guided by the guide section 37 to be smoothly lodged. It is also acceptable that the entire body of the transfer member lodging section 38 constitutes the guide section.

The transfer member lodging section 38 is preferably provided along the entire length of the side surface of the base block 14, and it extends in a direction tilted at a specified angle with respect to the lengthwise direction of the base block 14. Then, as shown in FIG. 5, the tilt angle of the transfer member lodging section 38 is set so that the guide section 37 becomes horizontal in a state in which the turntable 12 and the damper 17 are opened as a consequence of the counterclockwise pivoting by a specified angle of the base block 14 with respect to the upper plate 15 in the transfer standby stage of the tray 56.

It is to be noted that, according to the present embodiment, the base block 14 and the upper plate 15 can also be referred to as the first base member and the second base member, respectively, where the base block 14 is swingably supported with respect to the upper plate 15 and the guide section 37 and the transfer member lodging section 38 are provided on the base block 14.

When the transfer member 31 is driven rightward in FIG. 5 from the transfer standby state shown in FIG. 5 and the tray 56 and the disc 55 are set between the turntable 12 and the damper 17, the transfer member 31 is lodged in the transfer member lodging section 38 as guided by the guide section 37 in accordance with the above motion (see FIG. 6). In a state in which this guide section 37 is lodged, the base block 14 is pivoted in the clockwise direction by a specified drive mechanism, so that the disc 55 and the tray 56 are loaded on the turntable 12 and the disc 55 is pressed by the damper 17 whose pressure force is assisted by a specified mechanism against the turntable 12.

Thus, in the recording and reproducing unit 10 of the present embodiment, the guide section 37 and the transfer member lodging section 38 are provided on the swingable base block 14, and the transfer member 31 is lodged along the base block 14 when the disc 55 and the tray 56 are loaded on the turntable 12. With this arrangement, neither the guide section 37 nor the transfer member 31 interferes with the other drive components such as the turntable 12 and the pickup section 11 which are driven inside the disc changer body 2.

That is, in the disc changer body 2 having the limited space, the possible occurrence of the interference of the guide section 37 and the transfer member 31 with the other drive components 11 and 12 can be infallibly avoided.

It is to be noted that the present invention is not limited to the aforementioned embodiment, and it is a matter of course that the invention can be subject to a variety of improvements and changes in design within the scope of the essence thereof.

For example, the material of the transfer member 31 is not limited to the soft synthetic resin material, and a relatively hard rubber or a thin (e.g., about 0.1 to 0.2 mm thick) steel plate can be used as a material capable of producing a similar effect as stated before.

Furthermore, in the embodiment of the present invention, by providing the transfer member 31 with a rack 31a and driving the gear mechanism 34 meshed with this rack 31a, the transfer member 31 is driven in the disc transfer direction. However, instead of this, it is acceptable to bring, for example, a roller in contact with a belt-shaped transfer member and drive the transfer member by a frictional force generated between both the members when the roller is rotated.

According to the first aspect of the present invention, the transfer member is constructed so that it is elastically deformable in the direction perpendicular to the disc transfer direction, and it is elastically deformed by a specified quantity at its middle portion in the direction perpendicular to the disc transfer direction so that its portion corresponding to the disc lodging means is located outside the disc lodging means. With this arrangement, even when the guide section is provided inside the outermost portion of the outer wall of the magazine, the transfer member does not interfere with the disc lodging means. As a result, the space for the slide operation of the transfer member, i.e., the space between the outermost portion of the outer wall of the disc lodging means and the side plate of the disc changer body can be set small in the direction perpendicular to the disc transfer direction. That is, the disc changer can be made compact with a relatively simple construction.

Furthermore, the guide section can be placed within the traces of movement of the disc and the tray, thereby allowing the space outside the guide section to be effectively utilized.

According to the second aspect of the present invention, basically the same effect as that of the first aspect of the present invention can be produced. In particular, the guide passage of the guide section is located inside the outermost portion of the outer wall of the disc lodging means, and the transfer member is elastically deformed at its middle portion in the direction perpendicular to the disc transfer direction by the outermost portion of the outer wall of the disc lodging means when the transfer member slides into the position corresponding to the disc lodging means. Therefore, the transfer member can be elastically deformed by the outer wall of the disc lodging means so that the transfer member does not interfere with the disc lodging means.

Furthermore, according to the third aspect of the present invention, basically the same effect as that of the first aspect of the present invention can be produced. In particular, the guide passage of the guide section has the straight portion which extends in the disc transfer direction inside the outermost portion of the outer wall of the disc lodging means and the meander portion which meanders outwardly from the straight portion, and the transfer member is elastically deformed at its middle portion in the direction perpendicular to the sliding direction by the meander portion when the transfer member slides into the position corresponding to the disc lodging means. Therefore, the transfer member can be arbitrarily deformed elastically so that the transfer member is directed in the direction in which it does not interfere with the disc lodging means by appropriately setting the meander configuration of the meander portion.

Furthermore, according to the fourth aspect of the present invention, basically the same effect as that of any one of the first through third aspects of the present invention can be produced. Furthermore, the recording and reproducing unit is provided with the first base member and the second base member, where either one of these base members is swingably engaged with the other base member, and the guide section of the disc transfer means is provided on the one base member that is swingable. When the disc is loaded on the turntable, the transfer member is lodged along the one base member, and therefore, neither the guide section nor the transfer member interferes with the other drive components driven inside the disc changer body.

That is, in the disc changer body having the limited space, the possible occurrence of the interference of the guide section and the transfer member with the other drive components can be infallibly avoided.

What is claimed is:

1. A disc changer having a disc lodging means for lodging therein a disc, a recording and reproducing means for recording information on a disc or reproducing the information recorded on the disc, and a disc transfer means for transferring said disc between the disc lodging means and the recording and reproducing means, said disc transfer means comprising: an engagement portion to be engaged with the disc itself or a disc retaining member; a transfer member which extends in a disc transfer direction and is elastically deformable in a direction perpendicular to said transfer direction; a driving means for driving said transfer member in the disc transfer direction; and a guide section capable of slidably guiding said transfer member in the disc transfer direction, and said transfer member having a construction in which it is elastically deformed by a specified quantity at its middle portion in the direction perpendicular to the disc transfer direction so that its portion corresponding to said disc lodging means is located outside said disc lodging means.

2. A disc changer as claimed in claim 1, wherein said recording and reproducing means has a turntable on which the disc is placed and rotated, a pickup section for writing information on the disc or reading the information recorded on the disc rotated on said turntable, and is provided with a first base member for retaining said pickup section and said turntable and a second base member provided with a clamp member which presses the disc supported on said turntable against said turntable so as to hold the disc, one of said first and second base members being swingably engaged with the other of said first and second base members so that the disc and said clamp member are abuttable against each other and separable apart from each other, the guide section of said disc transfer means being provided on said one of said first and second base members, and said transfer member being lodged along said one of said first and second base members when said disc is loaded on said turntable.

3. A disc changer as claimed in claim 1, wherein a guide passage of said guide section is located inside an outermost portion of an outer wall of said disc lodging means, and said transfer member is elastically deformed at its middle portion in the direction perpendicular to the disc transfer direction by the outermost portion of said disc lodging means when said transfer member slides into a position corresponding to the disc lodging means.

4. A disc changer as claimed in claim 3, wherein said recording and reproducing means has a turntable on which the disc is placed and rotated, a pickup section for writing information on the disc or reading the information recorded on the disc rotated on said turntable, and is provided with a first base member for retaining said pickup section and said turntable and a second base member provided with a clamp member which presses the disc supported on said turntable against said turntable so as to hold the disc, one of said first and second base members being swingably engaged with the other of said first and second base members so that the disc and said clamp member are abuttable against each other and separable apart from each other, the guide section of said disc transfer means being provided on said one of said first and second base members, and said transfer member being lodged along said one of said first and second base members when said disc is loaded on said turntable.

5. A disc changer as claimed in claim 1, wherein a guide passage of said guide section has a straight portion which extends in the disc transfer direction inside an outermost portion of an outer wall of said disc lodging means and a meander portion which meanders outwardly from the straight portion, and said transfer member is deformed at its middle portion in the direction perpendicular to a direction in which it slides by the meander portion when said transfer member slides into a position corresponding to said disc lodging means.

6. A disc changer as claimed in claim 5, wherein said recording and reproducing means has a turntable on which the disc is placed and rotated, a pickup section for writing information on the disc or reading the information recorded on the disc rotated on said turntable, and is provided with a first base member for retaining said pickup section and said turntable and a second base member provided with a clamp member which presses the disc supported on said turntable against said turntable so as to hold the disc, one of said first and second base members being swingably engaged with the other of said first and second base members so that the disc and said clamp member are abuttable against each other and separable apart from each other, the guide section of said disc transfer means being provided on said one of said first and second base members, and said transfer member being lodged along said one of said first and second base members when said disc is loaded on said turntable.

* * * * *